US010152490B2

(12) United States Patent
Zakwieja et al.

(10) Patent No.: US 10,152,490 B2
(45) Date of Patent: Dec. 11, 2018

(54) SEQUENTIAL REPLICATION WITH LIMITED NUMBER OF OBJECTS (71) Applicant: SuccessFactors, Inc., South San Francisco, CA (US)

(72) Inventors: Christoph Zakwieja, Heidelberg (DE); Simon Dieterich, Wiesloch (DE); Jan Piechalski, Neckargemünd (DE); Dirk Richtsteiger, Karlsruhe (DE); Tobias Lukas Bader, Walldorf (DE); Christiane Konstandin, Walldorf (DE); Philipp Suenderhauf, Leimen (DE); Anna-Lena Wingert, Leimen (DE)

(73) Assignee: SuccessFactors, Inc., South San Francisco, CA (US)

( * ) Notice: Subject to any disclaimer, the term of this patent is extended or adjusted under 35 U.S.C. 154(b) by 400 days.

(21) Appl. No.: 14/982,251

(22) Filed: Dec. 29, 2015

(65) Prior Publication Data
US 2017/0185628 A1 Jun. 29, 2017

(51) Int. Cl.
*G06F 17/30* (2006.01)
(52) U.S. Cl.
CPC .............................. *G06F 17/30174* (2013.01)
(58) Field of Classification Search
CPC .................................................. G06F 17/30174
See application file for complete search history.

(56) References Cited

U.S. PATENT DOCUMENTS

| 7,103,797 | B1* | 9/2006 | Wahl | G06F 9/50 711/113 |
| 7,734,950 | B2* | 6/2010 | Rogers | G06F 11/2071 711/162 |
| 8,190,561 | B1* | 5/2012 | Poole | H04L 67/1095 707/610 |
| 8,341,134 | B2* | 12/2012 | Bourbonnais | G06F 17/30578 707/703 |
| 2010/0114824 | A1* | 5/2010 | Krishnaprasad | G06F 11/2094 707/637 |
| 2011/0196836 | A1* | 8/2011 | Kesselman | G06F 17/30575 707/634 |
| 2012/0303581 | A1* | 11/2012 | Calder | G06F 17/30575 707/626 |
| 2014/0351506 | A1* | 11/2014 | Santry | G06F 3/0619 711/114 |
| 2016/0112521 | A1* | 4/2016 | Lawson | H04L 67/16 709/227 |

* cited by examiner

*Primary Examiner* — Tyler Torgrimson
(74) *Attorney, Agent, or Firm* — Schwegman Lundberg & Woessner, P.A.

(57) ABSTRACT

A current time associated with a first received notification of a new object in a data set of a first system is accessed and a replication time is set to the current time. For each notification received regarding a new object in the data set of the first system, the new object is added to the replication queue. The new objects added to the queue are assigned the replication time until a specified maximum number of new objects have been added to the replication queue. Afterwards, new objects are added to the queue with no assigned replication time. When the objects in the queue are to be replicated, only the objects with the assigned replication time are copied from the queue to a second system. A new replication time is set to a new current time associated with confirmation of receipt of the copied objects received from the second system.

20 Claims, 9 Drawing Sheets

SEQUENTIAL REPLICATION WITH LIMITED NUMBER OF OBJECTS

TECHNICAL FIELD

The present disclosure relates generally to the sequential replication of data with a limited number of objects per replication. In an example embodiment, after setting a central "replication time" and assigning the replication time to a first set of data objects of a predetermined number that are added to a replication queue, a subsequent replication query will be limited to data objects with the assigned replication time.

BACKGROUND

Many software applications offer cloud-based solutions for activities that a user (e.g., a business organization) may have normally performed on their own system (e.g., enterprise resource planning (ERP) system). These applications can offer the replication of application data generated in the cloud to the user's system. The replication can be based on the concept of reading all data that has changed in the cloud-based system and replicating only the changed data to the user's system. Often a middleware system is used for the replication of data to the organization's system. Middleware refers to software that is developed to serve as an intermediary between separate, already existing software applications. Software applications connected using middleware can include enterprise applications (e.g., in ERP system) and Web services (e.g., provided via cloud-based system).

BRIEF DESCRIPTION OF DRAWINGS

The present disclosure is illustrated by way of example and not limitation in the figures of the accompanying drawings, in which like references indicate similar elements and in which.

SUMMARY

In some implementations, methods and apparatus, including computer program products, are provided for the sequential replication of data with a limited number of objects per replication.

A system for sequentially replicating data from a first system (e.g., cloud-based system) to a second system (e.g., ERP system) can include a controller module (e.g., in the cloud-based system) to organize the data in the first system prior to replication, and a replication module (e.g., in a middleware system associated with the ERP system) to query only a limited number of objects for replication to the second system. The controller module may, upon receiving a notification (e.g., first notification) that a data set in the first system includes a new object (e.g., software object that has been created or modified), access a current time (e.g., from system date/time stamp of the first system, for example: 27.11.2015 15:00) associated with the first received notification. The controller module may then set a central "replication time" for the first system to the accessed current time. Subsequently, for each notification received regarding a new object in the data set of the first system, the controller module can add the new object to a replication queue (e.g., data replication proxy list) and assign the replication time to the new object until a specified maximum number of new objects have been added to the replication queue with the replication time assigned to them. After the specified maximum number of new objects have been added to the replication queue with the replication time assigned to them, the controller module will add any subsequent new objects in the data set to the replication queue without assigning the replication time to the new object.

The replication module may, at the time of a scheduled data replication to the second system, read the central replication time from the controller module and query only the new objects with the assigned replication time from the replication queue to be copied from the data set to the second system. The second system, after checking the received data for any errors (e.g., corrupted file), may send a confirmation of receipt of the copied new objects (e.g., and any error messages corresponding to errors) to the controller module. The controller module can then access a new current time associated with the received confirmation and set a new central replication time for the first system to the accessed new current time.

The above methods, apparatus, and computer program products may, in some implementations, further include one or more of the following features.

The controller module may assign the new replication time to any new objects that were added to the replication queue without being assigned the replication time based on the number of new objects in the replication queue that have been assigned the new replication time being less than a specified maximum.

The controller module may clear the replication time (e.g., delete central replication time of first system) based on no new objects being in the replication queue.

The specified maximum number of objects which may be assigned a replication time (and therefore copied together in one replication) is based on the capabilities of the replication module (e.g., middleware), the first system, or the second system. Furthermore, the specified number may refer to a number that reflects an aggregate size (e.g., in kilobytes) of the objects in the replication queue which have been assigned the replication time.

The specified maximum number may also be based on the time of the query by the replication module. For example, at peak times (for the replication module (e.g., middleware), the first system or the second system) the specified number could be smaller in order to spread the load on the respective systems. An administrative user of the first system may also set the specified number according to need or convenience.

The specified maximum number may also be based on the frequency of the query by the replication module. For example, if the scheduled frequency of replications is high, then a low specified number should be sufficient to copy all of the new objects from the first system. However, if the scheduled frequency of replications is low, then a higher specified number will be needed to copy all of the new objects from the first system.

The specified maximum number may also be based on the number of new objects in the data set of the first system. For example, if a small number of new objects is present in the first system, then a low specified number should be sufficient to copy all of the new objects from the first system. However, if a larger number of new objects is present in the first system, then a higher specified number will be needed to copy all of the new objects from the first system The details of one or more variations of the subject matter described herein are set forth in the accompanying drawings and the description below. Other features and benefits of the subject matter described herein will be apparent from the description and drawings, and from the claims.

DETAILED DESCRIPTION

The replication of data between separate systems can be resource-intensive, especially for huge data loads like "Initial Load" scenarios where the data volume being replicated can reach the limit that can be handled by a middleware application tasked with the replication. An overly large data replication can lead to problems with memory and performance. Some simple approaches to solving the problem include increasing the system resources (e.g., memory) and reducing the data volume that is stored in a first system to be replicated to a second system. Another approach specifies manual user activities and can be implemented, for example, by using user-defined filter criteria or updating only a smaller user-selected set of data from the first system to the second system.

Embodiments described herein provide for addressing the problem by pre-packaging (e.g., organizing) the data in the first system automatically before it is copied to the second system. The data (e.g., records) can be stored in a queue and grouped into separate packages for sequential replication by assigning groups of records (or any other software object) of a specified number a "replication time". The specified number of records for the package size can be configured, for example, by an administrative user based on historical system performance data. Once the records of a package are replicated, then the next specified number of records in the queue are packaged together by assigning them a new replication time. The replication time and the specified number may be stored as central variables in the first system and can be accessed by middleware before performing a query for the data in the replication queue.

Figure 1:
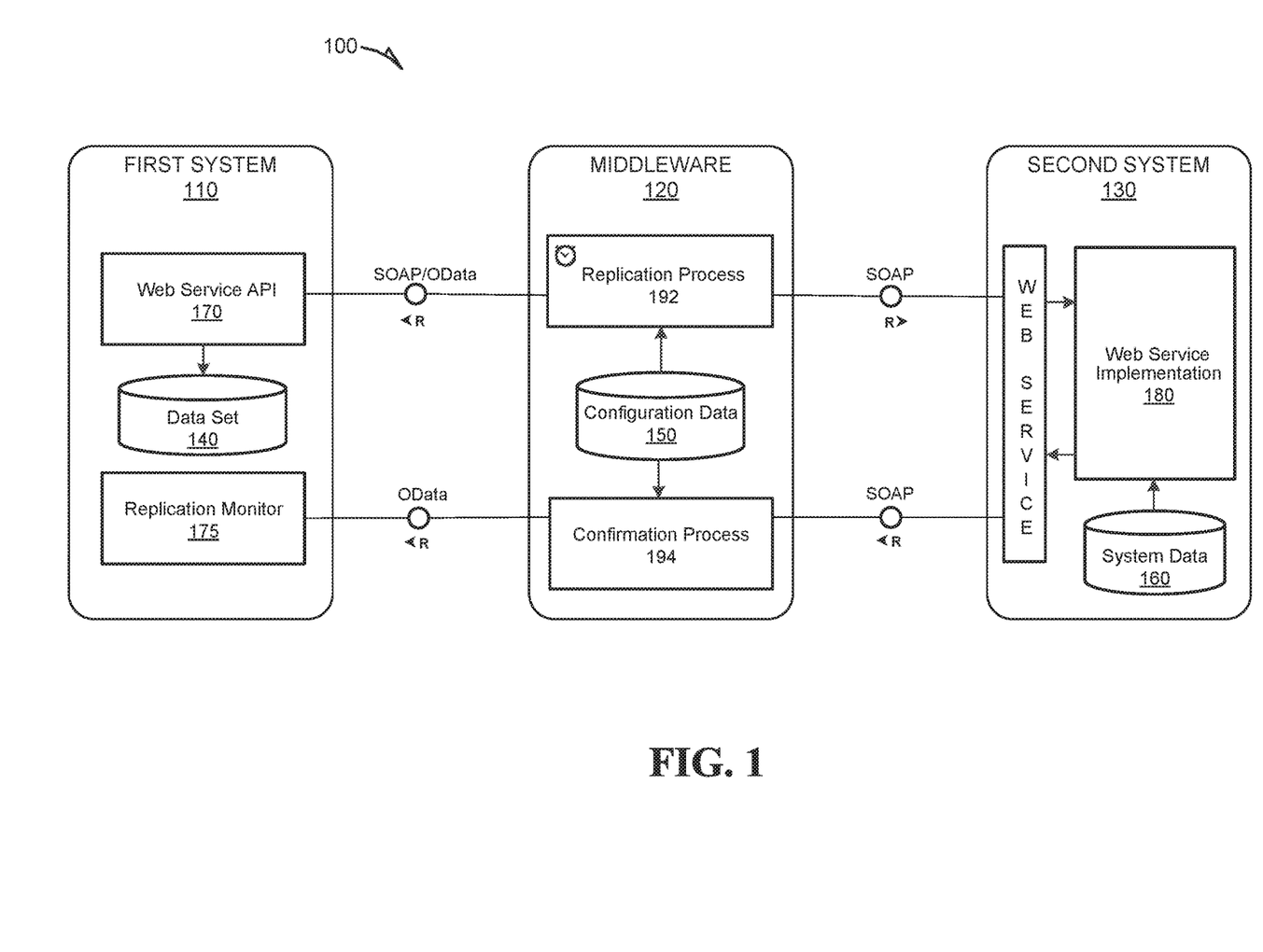
FIG. 1 is a block diagram of a data flow of a multi-system environment for performing replications of data between systems using middleware for the replications.

FIG. 1 is a block diagram of a data flow of a multi-system environment 100 for performing replications of data between systems using middleware for the replications.

Multi-system environment 100 includes a first system 110 (e.g., web service provider via web service API 170), a second system 130 (e.g., an ERP system that consumes web service via web service implementation 180) and middleware 120 tasked with replicating a data set 140 (e.g., web service data set) from the first system 110 to the second system 130. The connections shown in environment 100 can be any medium used to provide communications links between various devices (e.g., storage) and computers connected together within the environment 100. Environment 100 may include connections, such as wired, wireless communication links, fiber optic cables, or the like.

In environment 100, the separate systems (e.g., 110 and 130) communicate using Simple Object Access Protocol (SOAP) and/or Open Data Protocol (OData) for communicating with each other. However, other communication protocols could just as easily be used. In the environment 100 the entire replication process 192 is handled by middleware 120, which may be configured (e.g., by an administrator) using configuration data 150 to control the replication process 192 and the confirmation process 194 (e.g., confirm success of replication) independently of the first system 110 and the second system 130. At periodic intervals the middleware 120 will start the replication process 192 for all of the data from data set 140 of the first system 110 to system data 160 of the second system 130. A replication monitor 175 in first system 110 may receive error messages from middleware 120 with respect to the replication of an object of data set 140 and record the error for future correction or respond by re-transmitting the data object for which a replication error message has been received.

Figure 2:
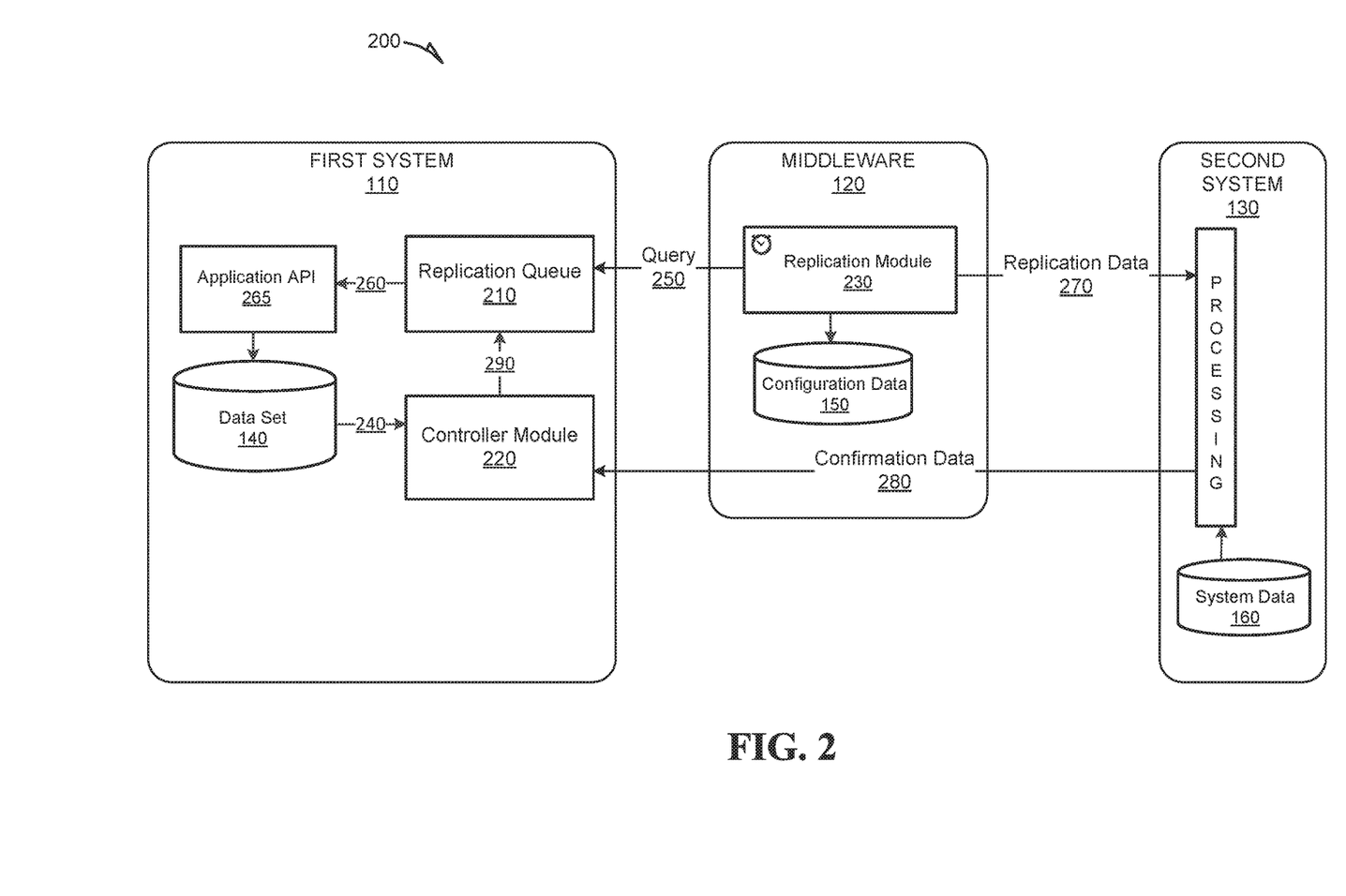
FIG. 2 is a block diagram of a data flow of a multi-system environment for performing sequential replications of new data between systems using middleware for the replications.

FIG. 2 is a block diagram of a data flow of a multi-system environment 200 for performing sequential replications of new data between systems using middleware for the replications. The elements in FIG. 2 include some elements from environment 100 in FIG. 1 and these elements are labeled with the same identifiers.

Multi-system environment 200 includes the first system 110, second system 130 and middleware 120 tasked with replicating a data set 140 from the first system 110 to the second system 130 via sequential replications of only data that has been created or modified since the last replication of data between system 110 and system 130. In order to identify the new data, first system 110 includes a replication queue 210 comprising a proxy listing of all of the new data objects in data set 140 of the first system 110. When new data is available in data set 140, a notification 240 is sent to a controller module 220, which adds the new object to the replication queue 210 in an update 290.

Middleware 120, at a scheduled replication time, will, via replication module 230, send a query 250 to the replication queue 210 for all of the new data in data set 140, and the replication queue 210 provides an indication 260 (e.g., how to address the new objects via application API 265) regarding the location of the new objects in data set 140 for which the replication queue 210 provides a proxy listing. The replication module 230 then sends replication data 270, including copies all of the new objects in data set 140, to system data 160 (e.g., via internal processing of the second system 130. The second system 130 then sends confirmation data 280 indicating the success or failure of the data replication for each of the new objects transmitted with replication data 270 to the controller module 220 of the first system 110. The controller module 220 can then update the objects currently in the replication queue 210 (e.g., remove from the replication queue 210 or leave on the replication queue 210) according to the success or failure of the data replication for each of the objects. A failure means, e.g., the object will be left on the replication queue 210 so that a new replication attempt will be made by the replication module 230 of middleware 120 at the next scheduled replication time.

The middleware 120 queries all of the new objects in the replication queue 210; there is no automatic mechanism to restrict the number of new objects that are queried to a smaller package for one replication process.

Figure 3:
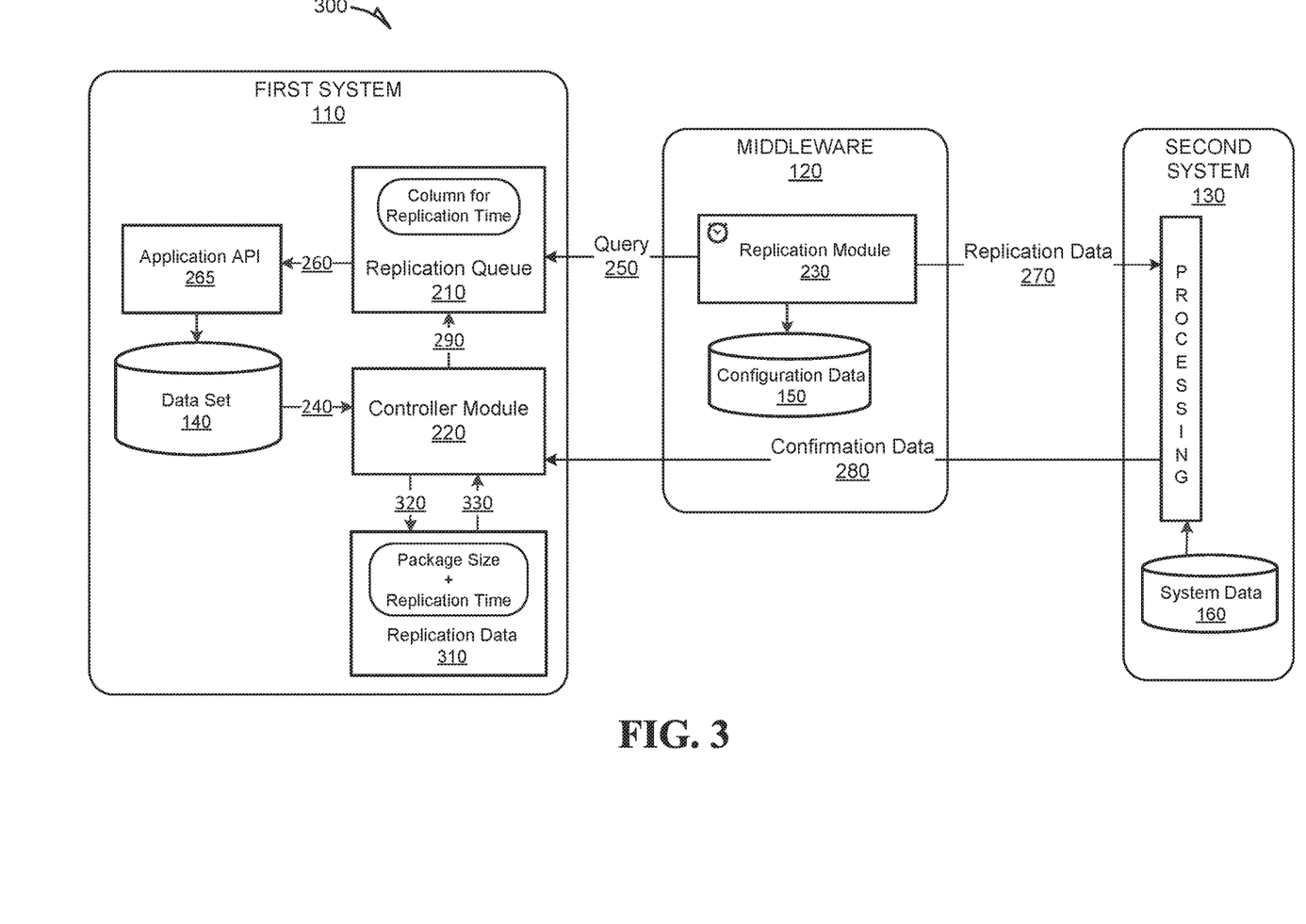
FIG. 3 is a block diagram of a data flow of a multi-system environment, consistent with some embodiments, configured to perform a sequential replication of data with a limited number of objects per replication.

FIG. 3 is a block diagram of a data flow of a multi-system environment 300, consistent with some embodiments, configured to perform a sequential replication of data with a limited number of objects per replication. The elements in FIG. 3 include some elements from FIGS. 1 and 2, and these elements are labeled with the same identifiers.

An environment 300 for sequentially replicating data from a first system 110 (e.g., a cloud-based system) to a second system 130 (e.g., an ERP system) can include a controller module 220 (e.g., in the cloud-based system) to organize the data in the first system 110 prior to replication of the data, and a replication module 230 (e.g., in middleware 120 associated with the second system 130) to query only a limited number of objects from the replication queue 210 for replication to the second system 130. In order to accomplish this, the first system 110 stores replication data 310 with parameters for controlling the number of objects that may be replicated in one replication process. The replication data 310 may include a specified or dynamically determined "package size" value to limit the number of objects (e.g., limited to the package size) that may be replicated in one replication process. The replication data 310 may also include a central "replication time" that can be used to identify groups of new data objects in the replication queue 210 that are to be replicated together in one package of a size that is not greater than the "package size" value.

The controller module 220 may, upon receiving a notification 240 (e.g., first notification) that a data set 140 in the first system 110 includes a new object (e.g., software object that has been created or modified), access a current time (e.g., from a first system 110 time stamp or date stamp, or both) associated with the first received notification 240. The controller module 220 may then set a central "replication time" for the first system 110 to the accessed current time and store the replication time in replication data 310 via an update 320. Subsequently, for each notification 240 received regarding a new object in the data set 140 of the first system 110, the controller module 220 can add the new object to a replication queue 210 (e.g., data replication proxy list) and assign the replication time in replication data 310 to the new object (e.g., add a new column for a replication time to a data record in the replication queue 210) until a specified maximum number of new objects have been added to the replication queue 210 with the replication time assigned to them. The specified maximum number is set according to the package size value stored in replication data 310 which is accessed by controller module 220 via access operation 330. After the specified maximum number of new objects have been added to the replication queue 210 with the replication time assigned to them, the controller module 220 will add any new objects in the data set 140 to the replication queue 210 without assigning the replication time to the new object.

Figure 4:
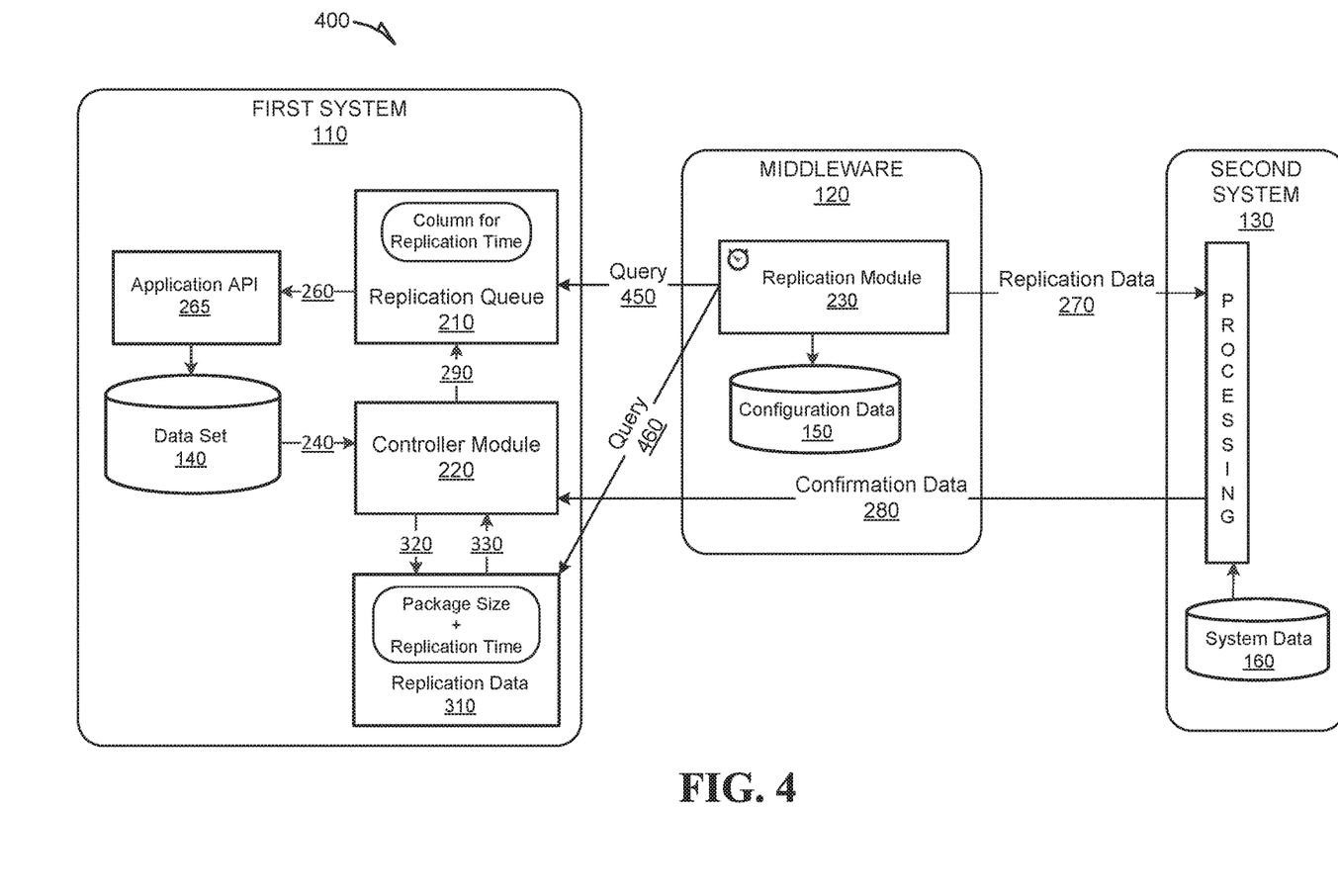
FIG. 4 is a block diagram of a data flow of a multi-system environment, consistent with some embodiments, configured to perform a sequential replication of data with a limited number of objects per replication.

FIG. 4 is a block diagram of a data flow of a multi-system environment 400, consistent with some embodiments, configured to perform a sequential replication of data with a limited number of objects per replication. The elements in FIG. 4 include some elements from FIGS. 1-3, and these elements are labeled with the same identifiers.

The replication module 230 of middleware 120 may be configured (e.g., by an administrator via configuration data 150) to, at the time of a scheduled data replication to the second system 130, read the central "replication time" from the replication data 310 (or from the controller module 220) via a query 460 and then use a query 450 to read only the new objects with the assigned replication time from the replication queue 210 to be copied from the data set 140) of the first system 110 to the second system 130. The second system 130, after checking the received data for any errors (e.g., corrupted files), may send a confirmation of receipt of the copied new objects (included in confirmation data 280 along with any error messages corresponding to errors) to the controller module 220.

Figure 5:
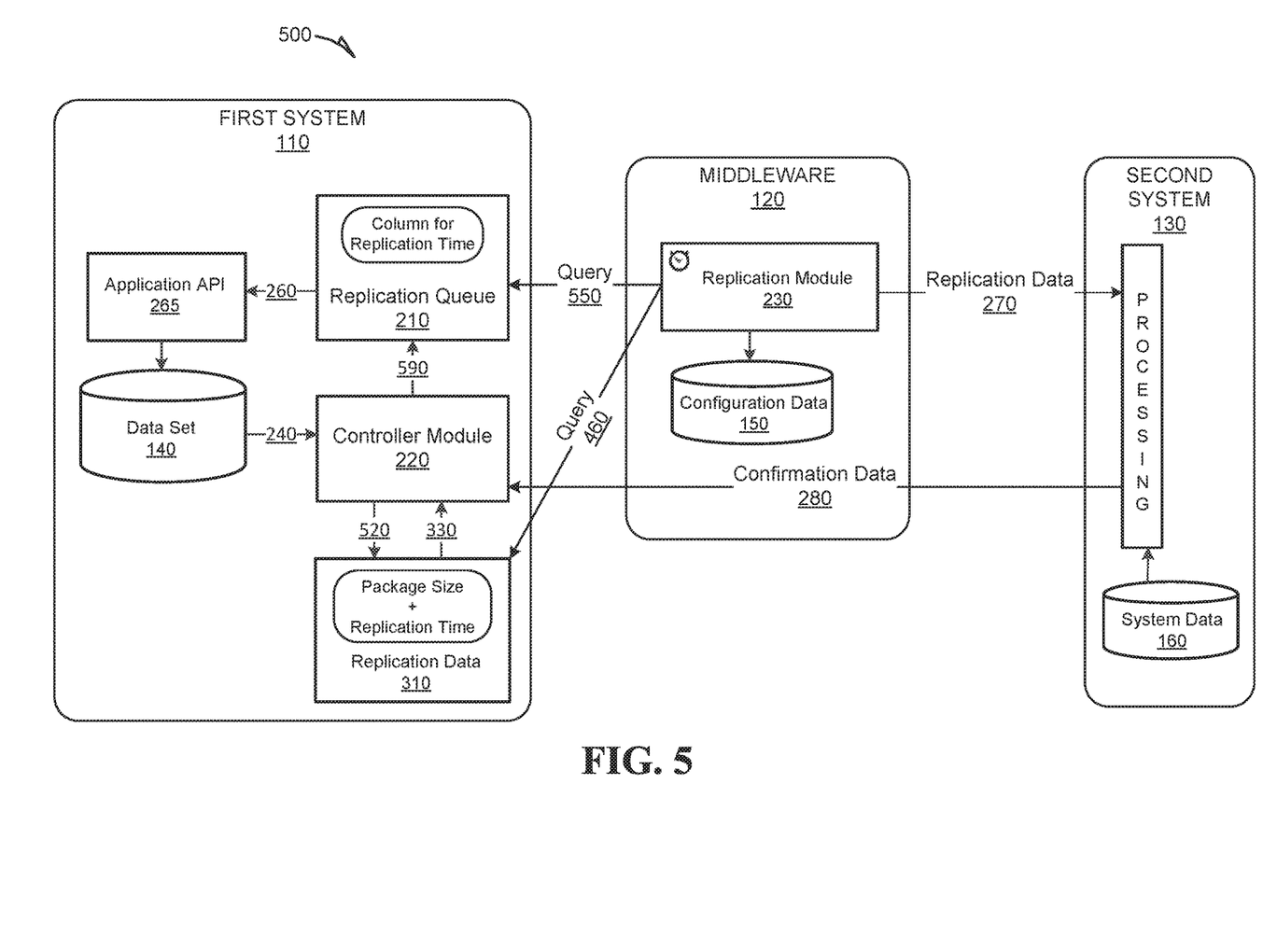
FIG. 5 is a block diagram of a data flow of a multi-system environment, consistent with some embodiments, configured to perform a sequential replication of data with a limited number of objects per replication.

FIG. 5 is a block diagram of a data flow of a multi-system environment 500, consistent with some embodiments, configured to perform a sequential replication of data with a limited number of objects per replication. The elements in FIG. 5 include some elements from FIGS. 1-4, and these elements are labeled with the same identifiers.

The controller module 220 can then access a new current time associated with the received confirmation data 280 (system date/time stamp when confirmation data 280 is received) and set a new central "replication time" in the replication data 310 to the accessed new current time via an update 520. The controller module 220 may then assign the new replication time to any new objects without an assigned replication time that are in the replication queue 210 based on the number of new objects in the replication queue 210 that have been assigned the new replication time being less than a specified maximum via an update 590. The controller module 220 may also clear the replication time (e.g., delete central replication time of the first system 110) based on no new objects being in the replication queue 210. If any errors were reported in confirmation data 280, the controller module 220 may simply leave the new data object that could not be replicated to the second system 130 in the replication queue 210 with the previously assigned replication time. The replication module 230 can then, at the next scheduled replication, query 550 for new objects in the replication queue 210 with the new replication time assigned to them and new objects in the replication queue 210 with replication times that are older than the new replication time in replication data 310.

Package Size:

The package size stored in the replication data 310 for limiting the number of new objects in the replication queue 210 that are assigned a same replication time (and therefore are copied together in one replication) can be based on the capabilities (e.g., memory, processing power, etc.) of the replication module 230 in middleware 120, the capabilities of the first system 110 or the capabilities of the second system 130. Furthermore the package size value stored in the replication data 310 may be a value that indicates an aggregate size (e.g., in kilobytes) of the objects in the replication queue 210 which have been assigned the replication time.

The package size stored in replication data 310 may also be based on the time of the query (e.g., query 250, 450 and 550) by the replication module 230. For example, at peak times (for the replication module 230 in middleware 120, the first system 110 or the second system 130) the package size could be smaller in order to spread the load on the respective systems. An administrative user of the first system 110 may also set the package size according to need or convenience.

The package size stored in the replication data 310 may also be based on the frequency of the query (e.g., query 250, 450 and 550) by the replication module 230. For example, if the scheduled frequency of replications is high, then a small package size should be sufficient to copy all of the new objects in the first system 110 to the second system 130. However, if the scheduled frequency of replications is low, then a larger package size will be needed to copy all of the new objects from the first system 10 to the second system 130.

The package size stored in the replication data 310 may also be based on the number of new objects in the data set 140 of the first system 10. For example, if a small number of new objects is present in the data set 140, then a small package size could be sufficient to copy all of the new objects from the first system 110 to the second system 130. However, if a larger number of new objects is present in the data set 140, then a larger package size will be needed to copy all of the new objects from the first system 110 to the second system 130.

Figure 6:
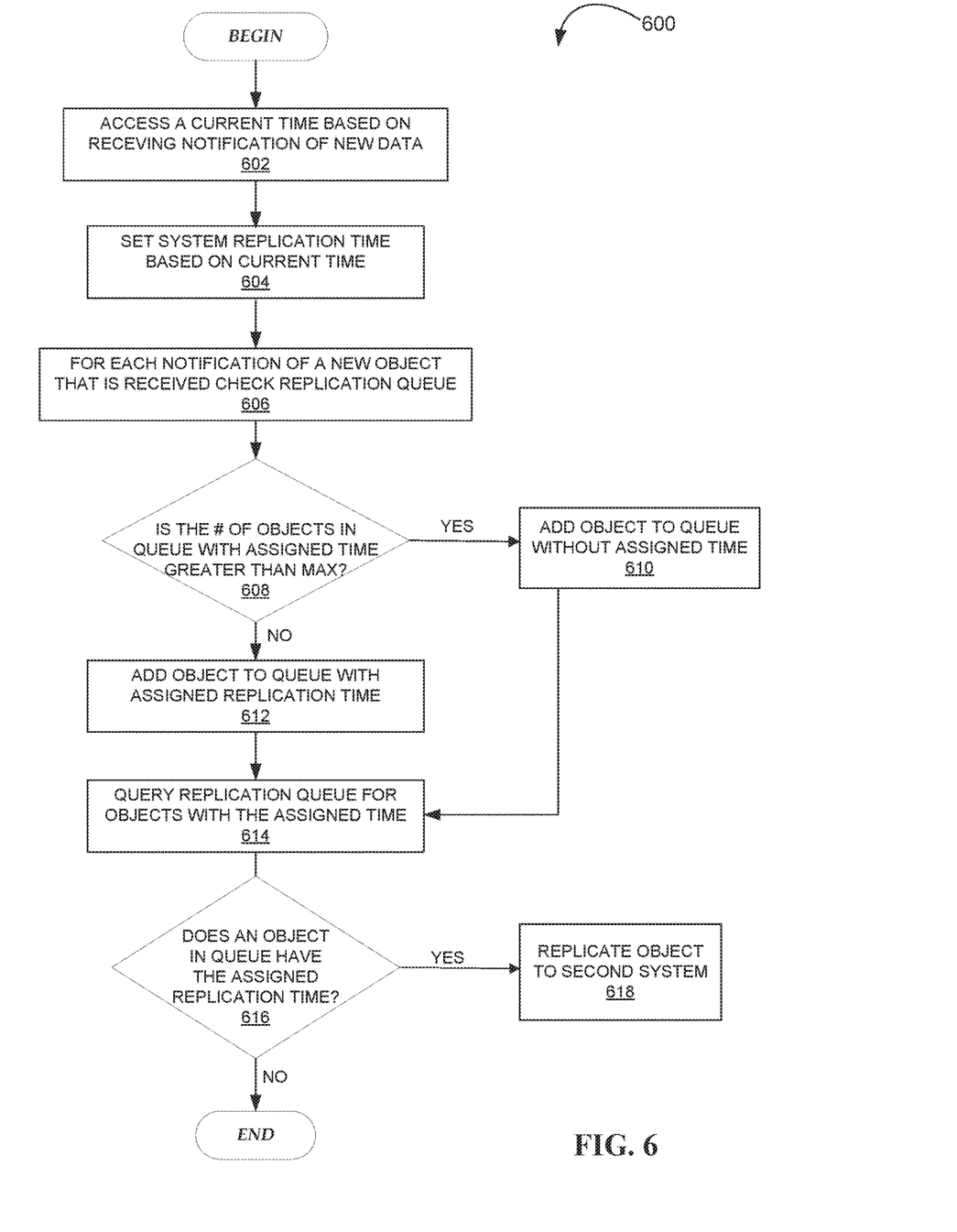
FIG. 6 is a flow diagram of a method, consistent with some embodiments, for performing a sequential replication of data with a limited number of objects per replication.

FIG. 6 is a flow diagram of a method 600, consistent with some embodiments, for performing a sequential replication of data with a limited number of objects per replication. The method 600 will be described with respect to the elements of FIGS. 1-5 as described above.

At operation 602, the controller module 220, upon receiving a notification 240 (e.g., a first notification) that a data set 140 in the first system 110 includes a new object, accesses a current time (e.g., from a first system 110 stamp) associated with the first received notification 240 (e.g., time of receipt of notification 240). At operation 604, the controller module 220 may then set a central "replication time" for the first system 110 to the accessed current time and store the replication time in replication data 310. At operation 606, for each notification 240 received regarding a new object in the data set 140 of the first system 110, the controller module 220 can check the contents of the replication queue 210 before adding the new object to the replication queue 210. At operation 608, for each new object in the replication queue 210: if the number of new objects in the replication queue 210 is less than a specified maximum, then at operation 612 the new object is added to the replication queue 210 with the assigned replication time. At operation 608, if the number of new objects in the replication queue 210 is greater than a specified maximum, then at operation 610 the new object is added to the replication queue 210 without the assigned replication time. The method 600 then continues to operation 614 from operations 610 and 612.

At operation 614, the replication module 230 may, at the time of a scheduled data replication to the second system 130, read the central "replication time" from the replication data 310 (or from the controller module 220) and then query only the new objects with the assigned replication time from the replication queue 210. At operation 616, if it is determined via the query that a new object in the replication queue 210 has the assigned replication time, then at operation 618 the new object is copied from the data set 140 of the first system 110 to the second system 130. If at operation 616 it is determined via the querying that no new objects in the replication queue 210 have the assigned replication time, the method 600 ends.

Figure 7:
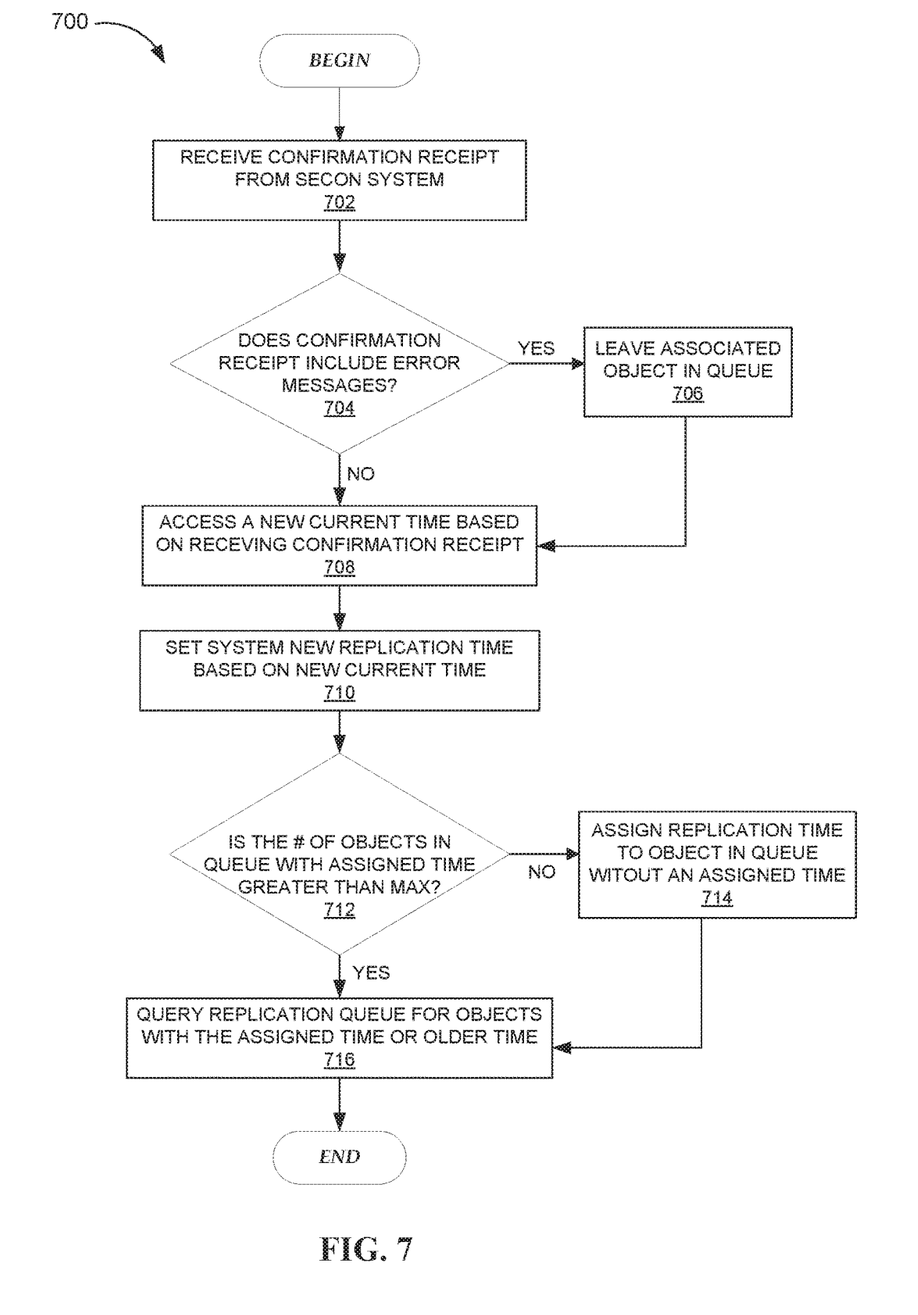
FIG. 7 is a flow diagram of a method, consistent with some embodiments, for performing a sequential replication of data with a limited number of objects per replication.

FIG. 7 is a flow diagram of a method 700, consistent with some embodiments, for performing a sequential replication of data with a limited number of objects per replication. The method 700 will be described with respect to the elements of FIGS. 1-5 as described above.

At operation 702, the second system 130, after checking the received data for any errors (e.g., corrupted files), may send a confirmation of receipt of the copied new objects (included in confirmation data 280 along with any error messages corresponding to errors) to the controller module 220. At operation 704, if any errors were reported in confirmation data 280 the controller module 220, at operation 706, may simply leave the new data object that could not be replicated to the second system 130 (e.g., an object associated with a received error message) in the replication queue 210 with the previously assigned replication time to be copied to the second system at later time. The method 600 then continues to operation 708 described below.

If errors were not reported in operation 704, then at operation 708, the controller module 220 can access a new current time associated with the received confirmation data 280 (system date/time stamp when confirmation data 280 is received) and, at operation 710, set a new central "replication time" in the replication data 310 based on the accessed new current time via an update (e.g., update 520). At operation 712, it is determined whether the number of new objects in the replication queue 210 that have been assigned the new replication is greater than a specified maximum. If it is determined that the number is not greater than the specified maximum, at operation 714, the controller module 220 assigns the new replication time to a new object without an assigned replication time that is in the replication queue 210 (e.g., with new objects that have been in the replication queue 210 longer being assigned the time first) until the number of new objects in the replication queue 210 that have been assigned the new replication time reaches the specified maximum or no more new objects remain. If it is determined at operation 712 that the number of new objects in the replication queue 210 that have been assigned the new replication time is greater than the specified maximum, then at operation 716, the replication module 230 can then, at the next scheduled replication query for new objects in the replication queue 210 with the new replication time assigned to them and query for new objects in the replication queue 210 with replication times that are older than the new replication time in replication data 310 (e.g., could not be copied earlier).

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein may, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or a server farm), while in other example embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments can be implemented in digital electronic circuitry, or in computer hardware, firmware, software, or combinations of these. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware can be a design choice. Below are set out hardware (e.g., machine) and software architectures that can be deployed, in various example embodiments.

Machine Architecture and Machine-Readable Medium

Figure 8:
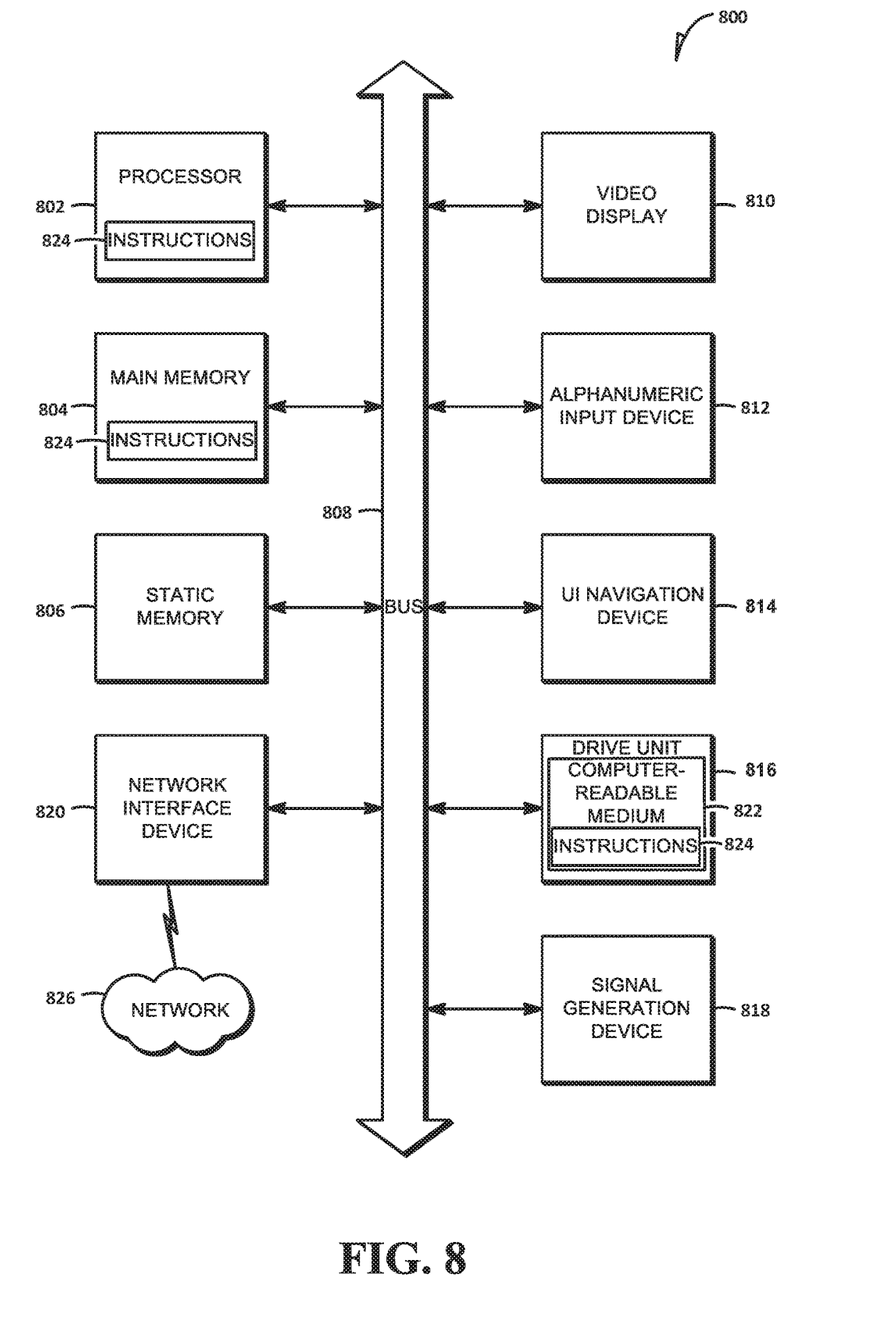
FIG. 8 is a diagrammatic representation of machine, in the example form of a computer system, within which a set of instructions may be executed to cause the machine to perform the methodologies discussed herein.

FIG. 8 is a block diagram of a machine in the example form of a computer system 800 within which instructions 824 for causing the machine to perform any one or more of the methodologies discussed herein can be executed. In alternative embodiments, the machine can operate as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a PC, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 can further include a video display unit 810 (e.g., a liquid crystal display (LCD) or a cathode ray tube (CRT)). The computer system 800 can also include an alphanumeric input device 812 (e.g., a keyboard or a touch-sensitive display screen), a user interface (UI) navigation device 814 (e.g., a mouse), a drive unit 816, a signal generation device 818 (e.g., a speaker), and a network interface device 820.

Machine-Readable Medium

The disk drive unit 816 includes a computer-readable medium 822 on which is stored one or more sets of data structures and instructions 824 (e.g., software) embodying or utilized by any one or more of the methodologies or functions described herein. The instructions 824 can also reside, completely or at least partially, within the main memory 804 and/or within the processor 802 during execution thereof by the computer system 800, the main memory 804 and the processor 802 also constituting machine-readable media.

While the computer-readable medium 822 is shown in an example embodiment to be a single medium, the term "machine-readable medium" can include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions (e.g., instructions 824) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and other ROM disks.

Transmission Medium

The instructions 824 can further be transmitted or received over a communications network 826 using a transmission medium. The instructions 824 can be transmitted using the network interface device 820 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions (e.g., instructions 824) for execution by the machine, and includes digital or analog communications signals or other media to facilitate communication of software.

Example Mobile Device

Figure 9:
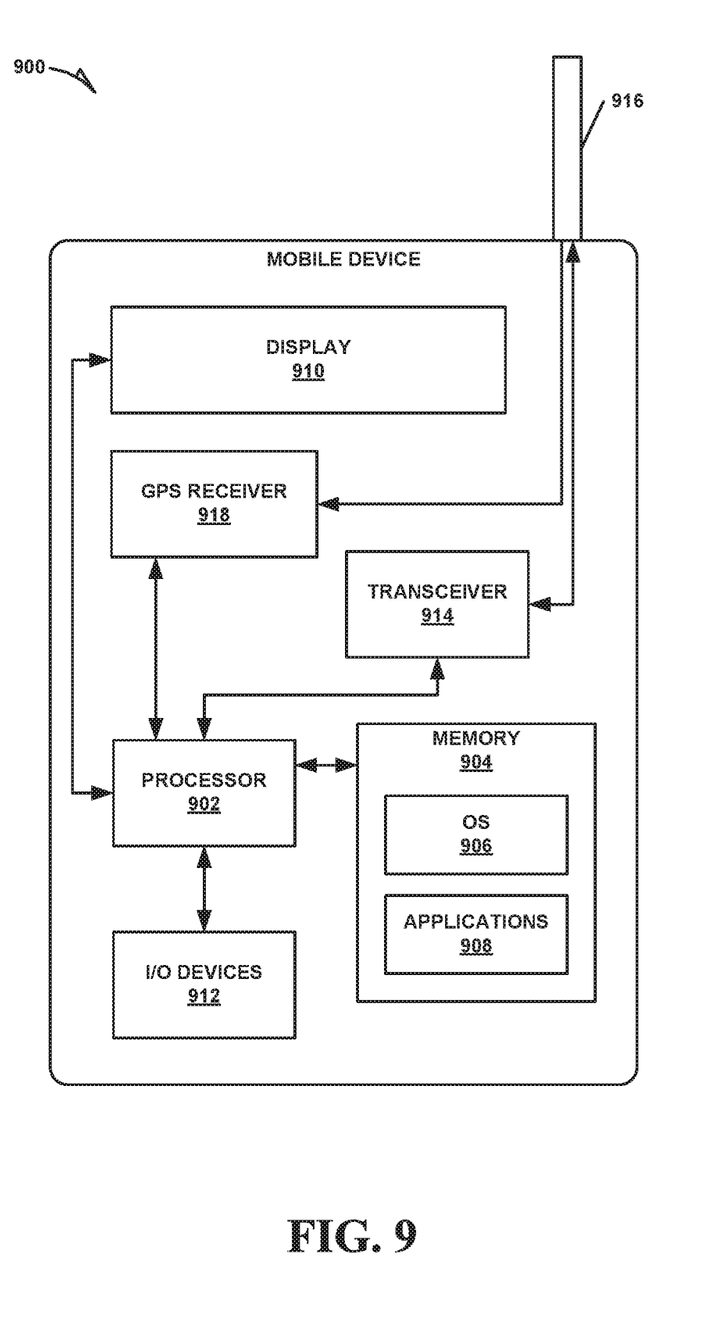
FIG. 9 is a block diagram illustrating a mobile device, according to an example embodiment.

FIG. 9 is a block diagram illustrating a mobile device 900, according to an example embodiment. The mobile device 900 may include a processor 902. The processor 902 may be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or another type of memory, is typically accessible to the processor 902. The memory 904 may be adapted to store an operating system (OS) 906, as well as applications 908, such as a mobile location-enabled application that may provide location-based services (LBSs) to a user. The processor 902 may be coupled, either directly or via appropriate intermediary hardware, to a display 910 and to one or more input/output (I/O) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a GPS receiver 918 may also make use of the antenna 916 to receive Global Positioning System (GPS) signals.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents.

The invention claimed is:

1. A system comprising:
   at least one hardware processor;
   a controller module implemented by the at least one processor and configured to:
   access a current time associated with a received notification of a new object in a data set of a first system;
   set a replication time to the accessed current time; and
   for each notification received regarding a new object in the data set of the first system:
     add the new object to a replication queue,
     assign the replication time to the new object when the number of new objects in the replication queue that have been assigned the replication time is less than a specified maximum, and
     not assign the replication time to the new object when the number of new objects in the replication queue that have been assigned the replication time is greater than the specified maximum;
   a replication module implemented by the at least one processor and configured to:
     read the replication time from the controller module;

query all new objects with the assigned replication time from the replication queue;
copy the queried new objects from the data set to a second system;
the controller module further configured to:
receive a confirmation from the second system that the copied new objects have been received;
access a new current time associated with the received confirmation; and
set a new replication time to the accessed new current time.

2. The system of claim 1, the controller module further configured to assign the new replication time to any new objects in the replication queue with no assigned replication time based on the number of new objects in the replication queue that have been assigned the new replication time being less than a specified maximum.

3. The system of claim 1, the controller module is further configured to clear the replication time or the new replication time based on no new objects being in the replication queue.

4. The system of claim 1, wherein the specified maximum number is based on capabilities of the replication module, the first system or the second system.

5. The system of claim 1, wherein the specified maximum number is based on the time of the query by the replication module.

6. The system of claim 1, wherein the specified maximum number is based on a frequency of a query by the replication module of all new objects with the assigned replication time from the replication queue.

7. The system of claim 1, wherein the specified maximum number is based on the number of new objects in the data set of the first system.

8. A method comprising:
accessing a current time associated with a received notification of a new object in a data set of a first system;
setting a replication time to the accessed current time; and
for each notification received regarding a new object in the data set of the first system:
adding the new object to a replication queue,
assigning the replication time to the new object when the number of new objects in the replication queue that have been assigned the replication time is less than a specified maximum, and
not assigning the replication time to the new object when the number of new objects in the replication queue that have been assigned the replication time is greater than the specified maximum;
querying all new objects with the assigned replication time from the replication queue;
copying the queried new objects from the data set to a second system;
receiving a confirmation from the second system that the copied new objects have been received;
accessing a new current time associated with the received confirmation; and
setting a new replication time to the accessed new current time.

9. The method of claim 8, further comprising assigning the new replication time to any new objects in the replication queue with no assigned replication time based on the number of new objects in the replication queue that have been assigned the new replication time being less than a specified maximum.

10. The method of claim 8, further comprising clearing the replication time or the new replication time based on no new objects being in the replication queue.

11. The method of claim 8, wherein the specified maximum number is based on capabilities of the first system, the second system or a middleware being used for the replication.

12. The method of claim 8, wherein the specified maximum number is based on the time of the querying.

13. The method of claim 8, wherein the specified maximum number is based on the frequency of the querying.

14. The method of claim 8, wherein the specified maximum number is based on a frequency of a query by the replication module of all new objects with the assigned replication time from the replication queue.

15. A non-transitory machine-readable storage medium storing instructions which, when executed by at least one processor of a machine, cause the machine to perform operations comprising:
accessing a current time associated with a received notification of a new object in a data set of a first system;
setting a replication time to the accessed current time; and
for each notification received regarding a new object in the data set of the first system:
adding the new object to a replication queue,
assigning the replication time to the new object when the number of new objects in the replication queue that have been assigned the replication time is less than a specified maximum, and
not assigning the replication time to the new object when the number of new objects in the replication queue that have been assigned the replication time is greater than the specified maximum;
querying all new objects with the assigned replication time from the replication queue;
copying the queried new objects from the data set to a second system;
receiving a confirmation from the second system that the copied new objects have been received;
accessing a new current time associated with the received confirmation; and
setting a new replication time to the accessed new current time.

16. The storage medium of claim 15, the operations further comprising assigning the new replication time to any new objects in the replication queue with no assigned replication time based on the number of new objects in the replication queue that have been assigned the new replication time being less than a specified maximum.

17. The storage medium of claim 15, the operations further comprising clearing the replication time based on no new objects being in the replication queue.

18. The storage medium of claim 15, wherein the specified maximum number is based on capabilities of the first system, the second system or a middleware being used for the replication.

19. The storage medium of claim 15, wherein the specified maximum number is based on the time of the querying or the frequency of the querying.

20. The storage medium of claim 15, wherein the specified maximum number is based on a frequency of a query by the replication module of all new objects with the assigned replication time from the replication queue.

* * * * *